United States Patent

Durig et al.

Patent Number: 6,084,849
Date of Patent: Jul. 4, 2000

[54] SHAPE MEMORY ALLOY RECORDING MEDIUM, STORAGE DEVICES BASED THEREON, AND METHOD FOR USING THESE STORAGE DEVICES

[75] Inventors: Urs Theodor Durig, Ruschlikon; Peter Vettiger, Langnau am Albis, both of Switzerland

[73] Assignee: International Business Machines Corporation, Armonk, N.Y.

[21] Appl. No.: 08/981,836

[22] PCT Filed: May 20, 1996

[86] PCT No.: PCT/IB96/00472

§ 371 Date: Jan. 7, 1998

§ 102(e) Date: Jan. 7, 1998

[87] PCT Pub. No.: WO97/44780

PCT Pub. Date: Nov. 27, 1997

[51] Int. Cl.[7] .................................................. G11B 9/00
[52] U.S. Cl. .................... 369/126; 369/127; 369/275.2
[58] Field of Search ................................ 369/126, 100, 369/127, 128, 130, 133, 134, 275.2, 275.5; 365/112, 113, 118, 174; 250/306, 307; 430/19, 495

[56] References Cited

U.S. PATENT DOCUMENTS

| | | | |
|---|---|---|---|
| 4,916,688 | 4/1990 | Foster et al. | |
| 5,307,311 | 4/1994 | Silwa, Jr. | |
| 5,389,475 | 2/1995 | Yanagisawa et al. | 369/126 |
| 5,777,977 | 7/1998 | Fujiwara et al. | 369/126 |
| 5,835,477 | 11/1998 | Binnig et al. | 369/126 |

FOREIGN PATENT DOCUMENTS

| | | |
|---|---|---|
| 15 22 989 | 10/1969 | European Pat. Off. . |
| 0 184 189 | 6/1986 | European Pat. Off. . |
| 0 247 219 A1 | 12/1987 | European Pat. Off. . |
| 0 360 337 | 3/1990 | European Pat. Off. . |
| 0 404 333 | 12/1990 | European Pat. Off. . |
| 0 568 753 | 11/1993 | European Pat. Off. . |
| 0 665 541 | 8/1995 | European Pat. Off. . |

OTHER PUBLICATIONS

Patent Abstracts of Japan, vol. 007, No. 127 (P–201), Jun. 3, 1993.
Patent Abstracts of Japan, vol. 016, No. 041 (M–1206), Jan. 31, 1992.
Patent Abstracts of Japan, vol. 009, No. 236 (P–390) [1959], Sep. 21, 1985.
Patent Abstracts of Japan, vol. 009, No. 190 (P–378), Aug. 7, 1985.
Patent Abstracts of Japan, vol. 009, No. 156 (P–368), Jun. 29, 1985.

*Primary Examiner*—Thang V. Tran
*Attorney, Agent, or Firm*—Scully, Scott, Murphy & Presser; Marc D. Schechter, Esq.

[57] ABSTRACT

The present invention concerns a storage medium for scanning probe storage devices. This storage medium comprises a substrate (20) carrying a shape memory alloy layer (24). The shape memory alloy layer (24) is chosen such that an indent (23) can be formed by mechanically deforming said shape memory alloy layer (24), if a local probe (21, 22) of said scanning probe system exerts pressure on said alloy layer (24). An indent (23) can be removed by locally heating said shape memory alloy layer (24) to its transformation temperature (Tc) or above such that the shape memory alloy returns to its Martensite form.

13 Claims, 4 Drawing Sheets

WRITE
(T < Tc)

READ
(T < Tc)

ERASE
(T > Tc)

SHAPE MEMORY ALLOY RECORDING MEDIUM, STORAGE DEVICES BASED THEREON, AND METHOD FOR USING THESE STORAGE DEVICES

TECHNICAL FIELD

The present invention relates to shape memory alloy storage media, storage devices based on these storage media, and methods for operating these devices.

BACKGROUND OF THE INVENTION

Improvements in semiconductor processing techniques have led to drastic reductions in the size of todays computers. However, while the microprocessors, displays and other components are getting cheaper and smaller, the bulk data memory units limit the overall size reduction. For further reduction in size and power consumption the conventional disk drive storage systems need to be replaced by small, high capacity storage devices.

There is a demand for storage devices having storage capacity of more than 1 Terabit. Further criteria for such storage devices are: power consumption, overall weight and size, reliability, data security, and shock resistance (if used in portable computer systems).

With a storage device which combines the capacity of a rotating memory with the speed, size, power consumption and reliability of solid state memories, computers would take another quantum leap in performance and compactness.

The development of scanning tunneling and atomic force microscopes has led to first storage systems which make use of local probes.

A scanning tunneling storage system has been proposed in the European patent EP 247219, for example. This system comprises current detectors being attached to an array of cantilevers. A storage medium is placed opposite to the array. The storage medium is displaced by means of a two-dimensional piezoelectric positioning device. There is no adequate approach for erasing of information disclosed.

In U.S. Pat. No. 5,307,311 a memory device is described which makes use of a very large set of independently operating subdevices. It employs an array of hundreds of microcantilevers having an area in which bits are stored. Opposite to these cantilevers there are hundreds of read/write heads which are similar in nature to scanning tunneling or atomic force microscope scanning tips. Each cantilever is moved in an oscillatory manner such that the respective read/write head scans over the bits stored thereon.

It is essential for a storage device that information can be recorded (WRITE), retrieved (READ) and deleted (ERASE). In particular in case of scanning probe storage systems which have been developed so far, no reliable and satisfying erase technique has been proposed. Recent material investigations have revealed special materials which are in principle suitable as erasable storage medium. However, steps required to erase information being stored in such a material are either to slow, or cannot be controlled properly to facilitate erasure of single bits within a storage medium. There is currently no storage medium known, which satisfies the needs for use in scanning probe storage devices.

A typical example of a scanning probe storage device and the mechanism for data recording is addressed in the U.S. Pat. No. 4,916,688. The storage medium comprises a state-transformable material. Current pulses induced by voltage pulses sufficient to selectively heat discrete areas of the state-transformable material are applied to a STM tip. If one cools the state-transformable material after local heating the electronic properties are locally altered. These locally altered areas can be detected (READ) using a STM tip and sensing the tunneling current between storage medium and tip.

In view of the disadvantages of known media suitable for use in scanning probe storage systems there is a need for improved materials and storage concepts in particular to overcome the known problems. The high resolution available through the application of a STM or AFM is certainly a most desirable attribute. However, for purposes of mass data storage, the storage medium as such requires additional attention.

It is an object of the present invention to provide a new and improved storage medium for storage system, and in particular for scanning probe storage systems.

It is an object of the present invention to provide a method for storing, retrieving and erasing from such a storage medium.

It is a further object of the present invention to provide new storage devices being enabled by the new storage medium, or making use of the new storage medium.

SUMMARY OF THE INVENTION

This has been achieved by the provision of a storage medium having
 a shape memory alloy (SMA) layer and
 a substrate carrying the SMA layer,
both being arranged such that information can be recorded (WRITE) by mechanically forming an indent in the SMA layer, e.g. by means of a scanning probe tip. The information recorded in form of indents in said SMA layer can be read by scanning the surface. Either an AFM, or a STM scanning probe or probe array can be used for the retrieval of information. Information can be erased from the new storage medium by locally heating the SMA layer above its transformation temperature (Tc). This can either be done by means of a scanning probe being heated such that it serves as heat source for locally heating the SMA layer, or a light pulse may be applied being suited to locally raise the SMA temperature beyond its transformation temperature Tc.

DESCRIPTION OF THE DRAWINGS

The invention is described in detail below with reference to the following schematic drawings.

GENERAL DESCRIPTION

It is shown in the following that shape-memory-alloys, if employed in an appropriate manner, can be used for making new storage media. These storage media a particularly well suited for use in connection with scanning probe storage systems.

Before addressing specific embodiments of the present invention, the underlying physical effect and the characteristic behavior of SMAs are described and examples of suited SMAs are given.

Shape-Memory-Alloy:

A SMA is a material which changes its shape in a reversible manner if heated or cooled appropriately. SMAs undergo a transformation in their crystal structure when cooled from the stronger, high temperature form (referred to as Austenite form) to the weaker, low temperature form (referred to as Martensite form). An SMA in Martensite form can be easily deformed to a new shape. If one now heats this SMA to a temperature above its transformation temperature (Tc), it automatically reverts to its Austenite form going back into its previous shape with great force. This process can be repeated millions of times without the material changing its properties. I.e., the SMA resumes the shape prior to its deformation when being heated to the temperature Tc or higher. The SMA does not change its shape when returning into the Martensite form by cooling.

The transformation temperature Tc depends on the composition of the SMA and other factors. The temperature Tc can be anywhere between 0 and 100 degree C. In certain cases the transformation temperature is even higher. The SMA and its composition should be selected such that it is suited for use in connection with the present invention. It is also important, that SMA materials are known which are extremely corrosion resistant (e.g. Ni—Ti compositions). This is of particular interest in connection with the present invention, because corrosion may cause problems at the surface of a storage medium leading to loss of data or an increased signal-to-noise ratio when retrieving information.

Typical examples of SMAs are alloys based on: Cu—Zn—Al, Ti—Ni such as the binary Ti—Ni thin films or the ternary shape memory alloys Ti—Ni—Cu and Ti—Ni—Pd, Fe—Mn—Si, Fe—Ni, Cu—Al—Ni, Ti—Ni—Hf, Au—Cd, Cu—Al—Be, or a quaternary alloy such as Ni—Al—Fe—Mn, or Ti—Pd-transition metal based alloys. Further examples are given in "Fundamentals and Industrial Technology of Copper and Copper Alloys", Japan Copper Drawing Association, published May 1988, and other publications.

SMA alloys in form of thin films or thicker layers can be formed using sputtering and evaporation techniques, for example. Also suited are Vacuum Induction Melting or Vacuum Arc Remelting techniques. Since the transformation temperature Tc of the various SMAs depends on the composition of the alloy, it is indispensable to have an accurate control of their composition. Well suited for making such alloys is the RF (radio frequency) sputter deposition technique because it allows to control the composition to a sufficient extent.

Figure 1:
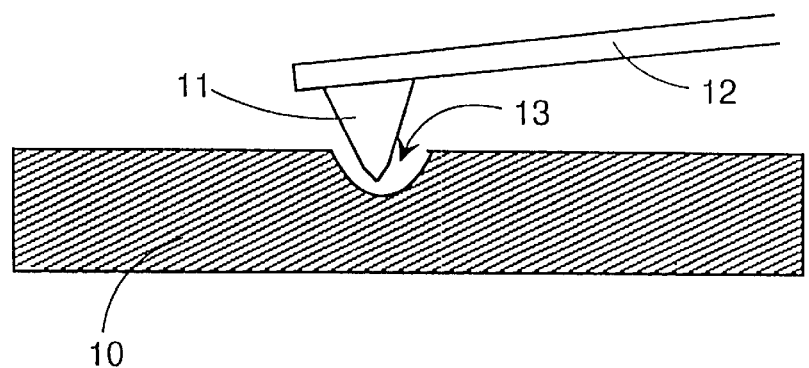
FIG. 1 shows a conventional scanning probe storage system.
Figure 2:
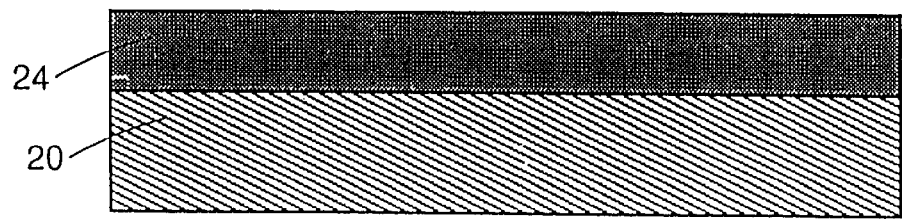
FIG. 2 shows a cross-section of a storage medium comprising a shape-memory-alloy (SMA) layer, according to the present invention.

A cross-sectional view of the basic structure of a new storage medium in accordance with the present invention is illustrated in FIG. 2. The storage medium at least comprises an SMA layer 24 and a substrate 20 being sufficiently rigid to carry this SMA layer 24. The thickness of the SMA layer is typically between 1 nm and 10 $\mu$m, and preferably between 10 nm and 500 nm, whereas the substrate has a thickness of a few hundred $\mu$m and more. Preferably, the thickness of the SMA layer should be about ½ of the maximum diameter of an indent 23, or thicker. I.e., if the indent has a diameter of 15 nm, for example, the SMA layer 24 should be 7.5 nm or thicker.

A scanning probe storage system, as hereinafter addressed, comprises at least one scanning probe. Such a scanning probe may consist of a cantilever 22 and a tip 21, as for example shown in FIG. 3A.

Figure 3A:
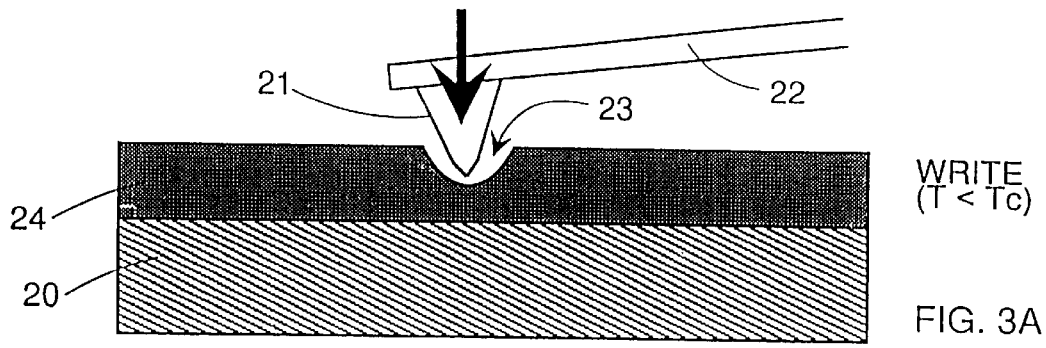
FIG. 3A shows a cross-section of a storage medium being similar to the one shown in FIG. 2 and a scanning probe exerting pressure on the medium such that information is stored in form of an indent.
Figure 3B:
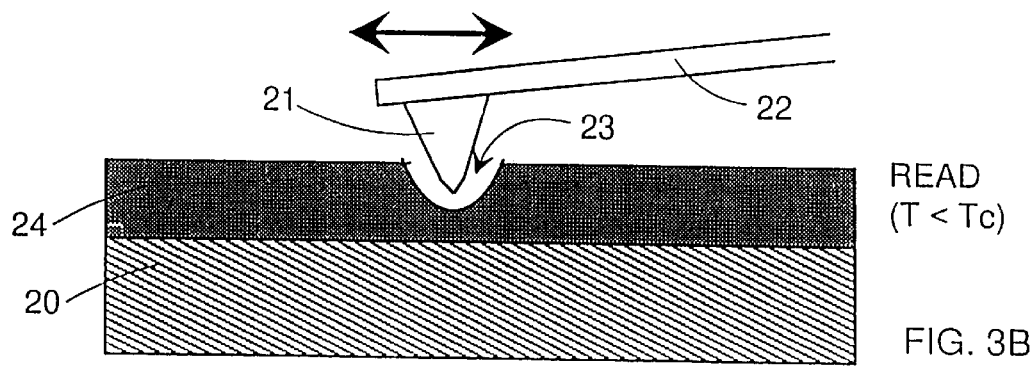
FIG. 3B shows a cross-section of a storage medium and a scanning probe moved across the storage medium for reading the information stored by detecting indents.
Figure 3C:
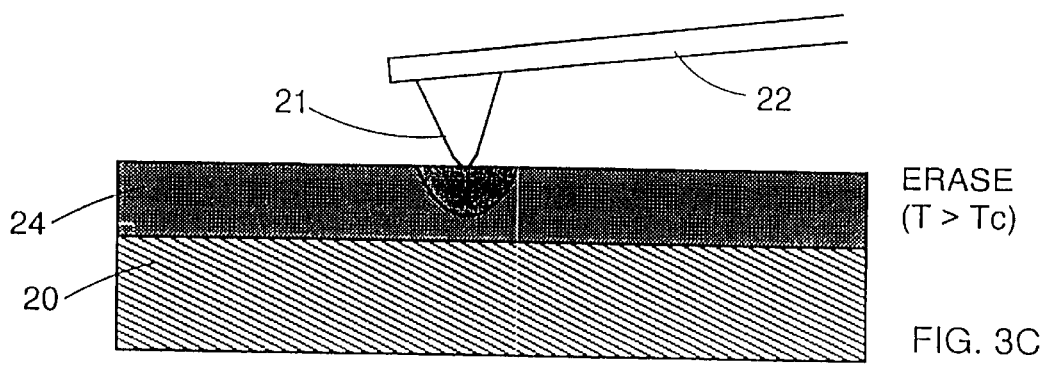
FIG. 3C shows a cross-section of a storage medium and a scanning probe, where an indent is removed by locally heating the region close to the indent using a local probe.

The operation of a scanning probe storage system, and in particular the different modes of operation, namely WRITE, READ and ERASE, are illustrated in FIGS. 3A through 3C.

The WRITE process is described in connection with FIG. 3A. In order to write information into the medium, indents 23 are formed mechanically. This can be done by means of a local probe 21, 22, or local probe arrays. If a force is applied to the local probe, the local probe deforms the surface of the SMA layer 24 such that an indent 23 is formed. The size and shape of such an indent 23 depends on the shape of the tip 21 of the local probe, the angle between local probe and storage medium, and, last but not least, the composition of the SMA. It is important to note that information is written into the medium at a temperature below the transformation temperature Tc. SMAs turned out to be fairly soft at temperatures below Tc and a contact pressure of a few hundred micro Pascal is sufficient to locally deform the SMA layer. With an AFM tip, for example, pressures of 10 Pascal and more are easily achieved.

Data can be stored in said medium in form of a sequence of small indents (pits), for example. If one employs a suited coding scheme, the information may be compressed, or the signal-to-noise ratio at retrieval may be improved.

The information stored in the new storage medium can be retrieved by means of a single scanning probe or a scanning probe array. In FIG. 3B, a single probe 21, 22, scanned across the surface of the SMA layer 24, is illustrated. There are various modes of operations of such scanning probes known in the art. In principle, any method being suited to detect small variations in the surface of the storage medium are also suited for use in connection with the present invention. Crucial is the resolution which can be obtained (the better the resolution, the more data can be stored on one and the same storage medium), and the velocity at which data can be read, the robustness of the local probe (wear-out and damage of the probe limits the reliability of the whole storage system), just to name some important aspects.

If the stored information is retrieved using a scanning probe operated in contact mode, for instance, the pressure exerted on the SMA layer 24 should be smaller than the pressure applied when writing indents. One may use a tip of different shape, size, or material when reading information, for example. The cantilever structures disclosed and claimed in the co-pending, unpublished PCT patent application PCT/IB 96/00209, are well suited. The larger tip of a cantilever structure disclosed in the co-pending patent application can be used for reading information, whereas the smaller tip can be used to write information.

In FIG. 3C, it is schematically indicated how an indent 23 can be removed. As described further above, a shape memory alloy returns to its original form (Martensite form) with great force if is is heated to the transformation temperature or higher. A local deformation 23 can thus be removed by locally heating the SMA layer 24 such that the transformation temperature is reached or exceeded. As soon as the transformation temperature is reached, the SMA layer 24 returns to its Martensite shape (shown in FIG. 2). The indent 23 is completely removed. This process can be repeated millions of times without leaving any marks or indications that there was an indent. This is very important, because information can be rewritten many times without having to deal with increased noise level, or shifted detection thresholds.

In the example illustrated in FIG. 3C, the tip 21 of a local probe is employed to locally heat the SMA layer 24. For this purpose, the cantilever 22 or the tip 21 can be heated either directly or indirectly such that heat is transferred into the SMA layer 24. Heat from the local probe can either be transferred by radiation if the tip 21 is positioned at close range, or it may be transferred from the tip 21 into the SMA layer by bringing it into contact.

Instead of using a local probe to erase the information, a light pulse may be directed right onto the indent 23. The intensity of such a light pulse has to be sufficient to locally raise the temperature such that Tc is reached or exceeded. If the substrate 20 is conductive, a current of sufficient density between the tip 21 and the substrate serving a back-electrode can be used to heat the SMA locally.

Figure 4A:
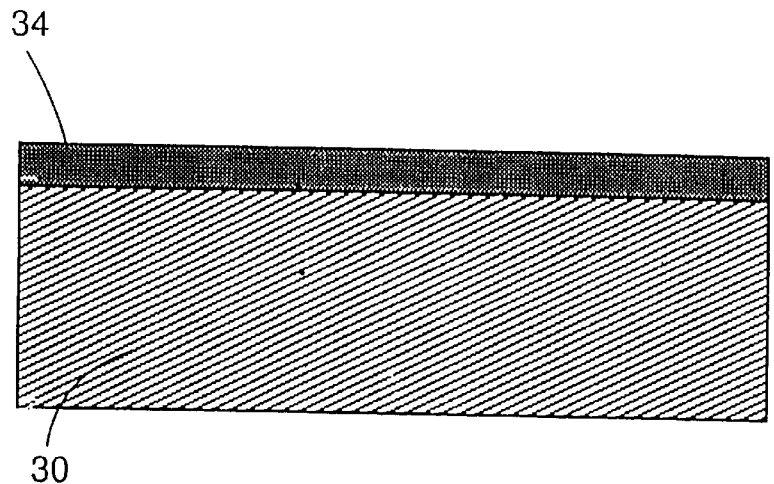
FIG. 4A shows a cross-section of another storage medium comprising a thin shape-memory-alloy (SMA) layer, according to the present invention.
Figure 4B:
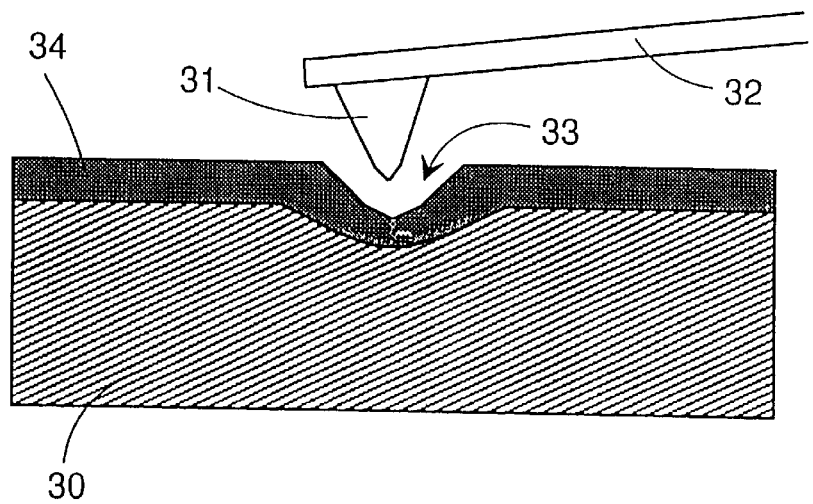
FIG. 4B shows a cross-section of the storage medium of FIG. 4A and a scanning probe exerting pressure on the medium such that information is stored in form of an indent.

Another storage medium according to the present invention is illustrated in FIG. 4A. This storage medium comprises a thin SMA layer 34 being carried by a substrate 30. It is illustrated in FIG. 4B how information is recorded. The tip of a scanning probe, for example, exerts pressure onto the thin SMA layer 34 such that also the underlying substrate 30 is deformed. The thickness of the SMA layer 34 and the substrate material are chosen such that firstly, indents can be formed which extend into the substrate, and secondly, these indents can be removed by local heating in a manner that not only the SMA layer 34, but also the substrate underneath return into its original shape. If the substrate is sufficiently soft, the SMA layer, when returning into the Martensite form, pulls the substrate back into the normal shape. The thickness of the SMA layer 34 is between 1 nm and 1 μm, and preferably between 1 nm and 100 nm.

Figure 5:
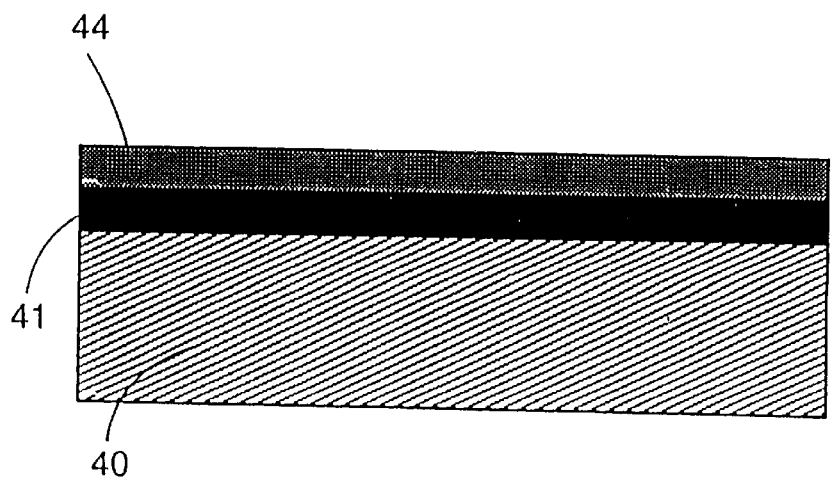
FIG. 5 shows a cross-section of another storage medium comprising a thin shape-memory-alloy (SMA) layer, according to the present invention.

The present storage media can be further modified by adding additional layers underneath or on top of the SMA layer. In FIG. 5, a layered storage medium is shown which comprises a substrate 40 covered by a soft layer 41 and a thin SMA layer 44. As in FIG. 4B, indents are formed by mechanically deforming the SMA layer 44 and the soft layer 41 underneath. In the embodiment the substrate 40 is not deformed at all.

In another embodiment, the SMA layer may be covered by a mono-layer of molecules, e.g. alkanethiol chain molecules. This mono-layer then serves as kind of a lubricant reducing the friction between the scanning probe and the storage medium.

The basic elements of scanning probe storage systems are described and claimed in co-pending PCT patent application PCT/IB 95/00594. The details of this patent application are herewith incorporated by means of reference.

Figure 6:
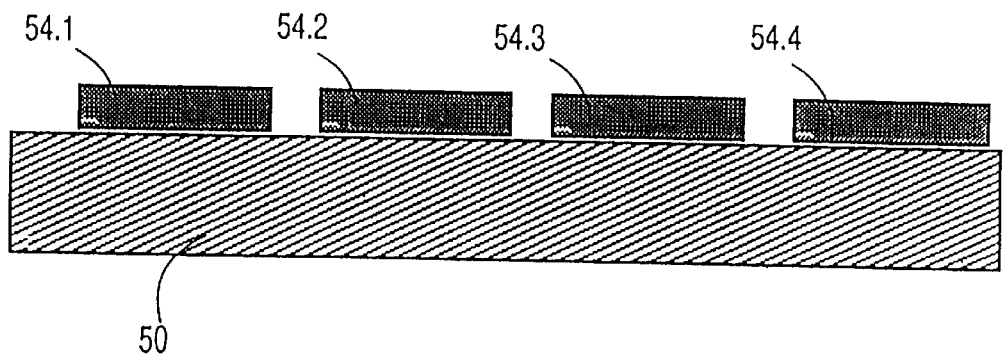
FIG. 6 shows a cross-section of another storage medium having several storage fields each comprising a shape-memory-alloy (SMA) layer, according to the present invention.
Figure 7:
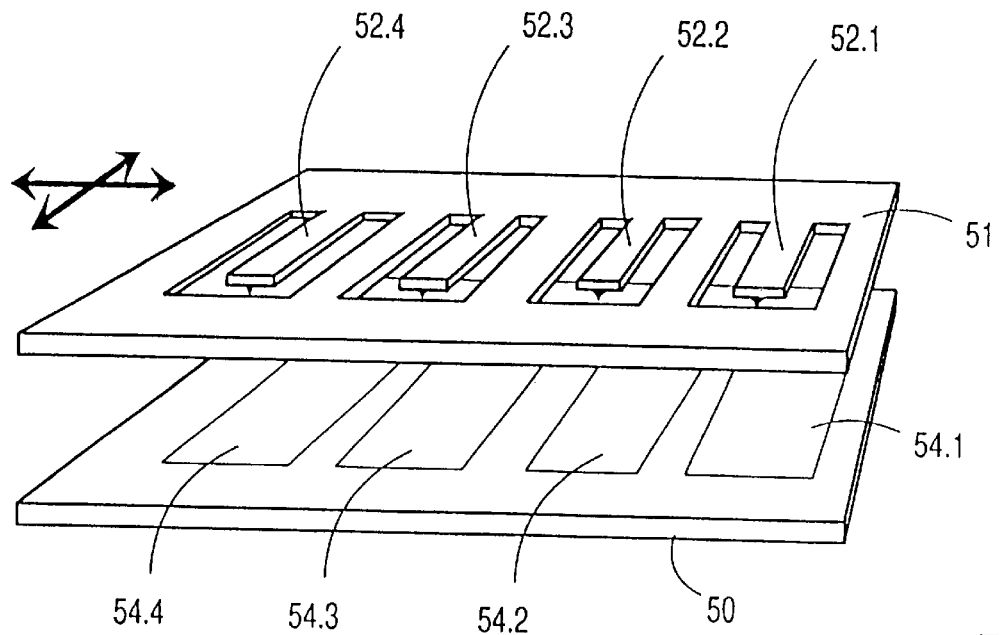
FIG. 7 shows a schematic view of a scanning probe storage system having a local probe array positioned opposite to a storage medium as shown in FIG. 6.

Another embodiment of the present invention is described in connection with FIGS. 6 and 7. In FIG. 6, a cross-sectional view of a storage medium with several storage fields 54.1–54.4 is shown. Each storage field 54.1–54.4 consists of an SMA layer. These SMA layers are carried by a common substrate 50. A scanning probe storage system in accordance with the present invention, further comprises local probe array with cantilevers 52.1–52.4, as illustrated in FIG. 7. Each cantilever carries at least one tip for interaction with the storage fields 54.1–54.4 of the storage medium. The array of cantilevers with the respective tips is scanned as a whole over the corresponding storage fields 54.1–54.4 and the data in each storage field are addressed quasi-simultaneously. In addition to this lateral movement a displacement of the array in the direction perpendicular to the medium might be useful, e.g. when parking the array. The maximum lateral scan excursion of a tip depends on the dimension of a single storage field. In the present example, the maximum scan excursion may be $\geq 30$ μm. Using known x-y positioning means, an access time in the range of 1 ms to 1 μs can be achieved. This compares very favorably with present day disc drive access times of about 10 ms. In case of a storage system as illustrated in FIG. 7, a total data rate of 100 Mbits/s can be obtained (assuming $10^6$ bits/storage field, 1000 fields and 100 kHz scan speed), of course, these numbers scale with the the scan speed and the number of storage fields.

In the following the process of writing information is outlined:

1. In order to record (WRITE) information in a storage medium according to the present invention, suited pulses are fed to a local probe used for writing information.
2. These pulses affect a deflection of the local probe such that an indent is formed in that the probe is pressed against said storage medium.
3. A sequence of indents is written if said probe is scanned across the medium.

Information stored in form of indents can be retrieved as follows:

1. Either the local probe used for the recording of information or another probe is scanned across the storage medium of section of the storage medium where the respective information is stored.
2. The local probe is scanned across the storage medium such that an output signal is provided which can be used to detect an indent or sequence of indents.

It is important that the temperature of the system is kept below the transformation temperature Tc of the SMA used, because otherwise information may be deleted or modified.

Information can be deleted in a selective manner, e.g. bit-by-bit, by carrying out the following steps:

1. Identifying an indent in the present storage medium which is to be deleted,
2. positioning a heat source such that this indent and/or the surrounding medium can be heated,
3. applying a signal of appropriate amplitude and duration to said heat source such that this indent and/or the surrounding medium is heated to the transformation temperature Tc or above so as to return into its Martensite form.

As mentioned above, the heat pulse can either come from a light source, such as a semiconductor laser, emitting light at a wavelength suited for locally heating said storage medium, or a local probe with means for direct or indirect heating can be employed. For direct heating, the cantilever carrying the probe may comprise a metallization for electrically heating the probe. The heat may be generated by a voltage drop at a resistor formed in or at the cantilever. Instead, the local probe may be indirectly heated using incident light from a light source. Depending on the process used for transferring the heat from the heat source to the storage medium, the scan speed has to be controlled. The faster the storage medium can be locally heated, the faster information can be erased because the heat source can be scanned across the medium faster.

In the erase mode the heat source can either be scanned continuously across the medium, or the heat source may be moved step-by-step. If moved step-by-step, the duration needed for locally heating the medium defines how long the heat source has to be stopped while heating. The heat source's inertia defines how long it takes to bring it up to speed again. Both together defines the average scan speed which can be obtained while erasing information.

If one wants to erase the whole storage medium or whole storage fields, according to the present invention, it is advantageous to heat the whole storage, or the respective storage field only, such that its overall temperature reaches the transformation temperature for a short period of time. All indents and other deformations are automatically removed because the shape memory alloy returns to its Martensite form.

What is claimed is:

1. Storage medium for use in a scanning probe storage system comprising a substrate (20; 30; 40 50) carrying a shape memory alloy layer (24; 34; 44; 54.x), wherein said shape memory alloy layer is covered by a mono-layer of molecules serving as a lubricant reducing friction between a local probe and the storage medium, said storage medium characterized in that said shape memory alloy layer (24; 34; 44; 54.x) is chosen such an incident (23; 33) is formed by mechanically deforming said shape memory alloy (24; 34; 44; 54.x) when a local probe of a scanning probe system exerts pressure on said shape memory alloy layer (24; 34; 44; 54.x); and an indent (22; 33) is removed by locally heating said shape memory alloy layer (24; 34; 44; 54.x) to its transformation temperature (Tc) or above.

2. The storage medium of claim 1, wherein said shape memory alloy layer (24; 34) is the uppermost layer directly facing the local probe of said scanning probe system.

3. The storage medium of claim 1, wherein said shape memory alloy layer (24; 34; 44; 54.x) has a thickness of 1 nm to 10 $\mu$m, and preferably between 10 nm and 500 nm.

4. The storage medium of claim 1, wherein said shape memory alloy layer (24; 34; 44; 54.x) comprises a binary, ternary, or quaternary composition of alloys.

5. The storage medium of claim 1, wherein said shape memory alloy layer (34) has a thickness such that said indent (33) extends through it into the substrate (30) underneath.

6. The storage medium of claim 5, wherein a soft layer (41) is situated between said shape memory alloy layer (44) and said substrate (40), said shape memory alloy layer (44) having a thickness such that said indent extends through it into said soft layer (41) underneath.

7. The storage medium of claim 1, comprising at least two storage fields each having at least the shape memory alloy layer (54.x), said substrate being a common substrate (50) carrying said storage fields.

8. Scanning probe storage system comprising a scanning probe or a scanning probe array and a storage medium, said storage medium comprising a substrate (20; 30; 40 50) carrying a shape memory alloy layer (24; 34; 44; 54.x), wherein said shape memory alloy layer is covered by a mono-layer of molecules serving as a lubricant reducing friction between a local probe and the storage medium, said storage medium characterized in that said shape memory alloy layer (24; 34; 44; 54.x) is chosen such an incident (23; 33) is formed by mechanically deforming said shape memory alloy (24; 34; 44; 54.x) when a local probe of the scanning probe system exerts pressure on said shape memory alloy layer (24; 34; 44; 54.x); and an indent (22; 33) is removed by locally heating said shape memory alloy layer (24; 34; 44; 54.x) to its transformation temperature (Tc) or above.

9. The scanning probe storage system of claim 8, wherein said local probe comprises means for exerting a pressure on said shape memory alloy layer in order to form an indent if an appropriate signal is applied.

10. The scanning probe storage system of claim 8, comprising means for scanning a local probe across said storage medium and means for detecting indents in said shape memory alloy layer.

11. The scanning probe storage system of claim 8, comprising a heat source for locally heating said shape memory alloy layer to its transformation temperature (Tc) or above such that an indent close to the location being heated is removed if said shape memory alloy layer returns into its Martensite form.

12. The scanning probe storage system of claim 8, wherein said heat source is a local probe having means for directly or indirectly heating it.

13. The scanning probe storage system of claim 8, wherein said heat source is a light source.

* * * * *